United States Patent [19]
Tatah

[11] Patent Number: 6,037,564
[45] Date of Patent: Mar. 14, 2000

[54] METHOD FOR SCANNING A BEAM AND AN APPARATUS THEREFOR

[75] Inventor: Abdelkrim Tatah, Arlington, Mass.

[73] Assignee: Matsushita Electric Industrial Co., Ltd., Osaka, Japan

[21] Appl. No.: 09/052,660

[22] Filed: Mar. 31, 1998

[51] Int. Cl.[7] .................................................. B23K 26/06
[52] U.S. Cl. .................................. 219/121.7; 219/121.71; 219/121.73; 219/121.75; 219/121.77; 219/121.74
[58] Field of Search ............................ 219/121.7, 121.71, 219/121.73, 121.75, 121.74, 121.76, 121.77

[56] References Cited

U.S. PATENT DOCUMENTS

| | | | |
|---|---|---|---|
| 3,364,497 | 1/1968 | MacAdam | 219/121.74 X |
| 3,617,702 | 11/1971 | Flournoy | 219/121.7 X |
| 4,564,739 | 1/1986 | Mattelin | 219/121.68 |
| 5,029,243 | 7/1991 | Dammann et al. | 219/121.77 |
| 5,057,184 | 10/1991 | Gupta et al. . | |
| 5,079,070 | 1/1992 | Chalco et al. . | |
| 5,168,454 | 12/1992 | LaPlante et al. . | |
| 5,231,264 | 7/1993 | Fujita | 219/121.78 |
| 5,373,137 | 12/1994 | McLaughlin | 219/121.74 X |
| 5,391,151 | 2/1995 | Nelson | 359/22 |
| 5,517,347 | 5/1996 | Sampsell . | |
| 5,521,628 | 5/1996 | Montgomery | 347/243 |
| 5,624,437 | 4/1997 | Freeman et al. | 606/12 |
| 5,676,866 | 10/1997 | Baumen et al. | 219/121.77 |
| 5,684,617 | 11/1997 | Langhans | 219/121.7 X |
| 5,717,513 | 2/1998 | Weaver . | |

FOREIGN PATENT DOCUMENTS

| | | | |
|---|---|---|---|
| 7-32183 | 2/1995 | Japan | 219/121.75 |
| 8-39283 | 2/1996 | Japan | 219/121.77 |
| 8-174242 | 7/1996 | Japan . | |

*Primary Examiner*—Gregory Mills
*Attorney, Agent, or Firm*—Ratner & Prestia

[57] ABSTRACT

A method for directing a light beam to a substrate and an apparatus to do the same. A single light beam is directed to a diffractive element. The diffractive element diffracts the single light beam to form a plurality of light beams. A controller generates a first control signal for controlling a digital micromirror device which selectively directs each of the plurality of light beams toward or away from the substrate. A lens focuses each selectively directed beam onto the substrate.

12 Claims, 4 Drawing Sheets

METHOD FOR SCANNING A BEAM AND AN APPARATUS THEREFOR

FIELD OF THE INVENTION

This invention relates to scanning a coherent light beam and, in particular, to selectively scanning a plurality of coherent light beams across a workpiece.

BACKGROUND OF THE INVENTION

Lasers are scanned for a variety of purposes including drilling holes in a workpiece. An apparatus and method for drilling holes in a workpiece using a laser are described by LaPlante et al. in U.S. Pat. No. 5,168,454, which is incorporated herein by reference for its teachings on laser machining. As shown in FIG. 1, holes may be formed in a workpiece 55 by scanning a single beam along a first axis 62 and along a second axis 63. A rotating polygonal mirror 35 is used to scan the single beam along the first axis 62, and the workpiece may be translated using a translation table 61 to direct the beam along the second axis 63.

SUMMARY OF THE INVENTION

The present invention provides a method for selectively directing each of a plurality of light beams to a substrate and an apparatus to do the same. A single light beam is directed to a diffractive element. The diffractive element diffracts the single light beam to form a plurality of light beams. A controller generates a first control signal for controlling a digital micromirror assembly which selectively directs each of the plurality of light beams toward or away from the substrate. A lens focuses onto the substrate each of the plurality of light beams selectively directed toward the substrate.

It is to be understood that both the foregoing general description and the following detailed description are exemplary, but are not restrictive, of the invention.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Figure 2:
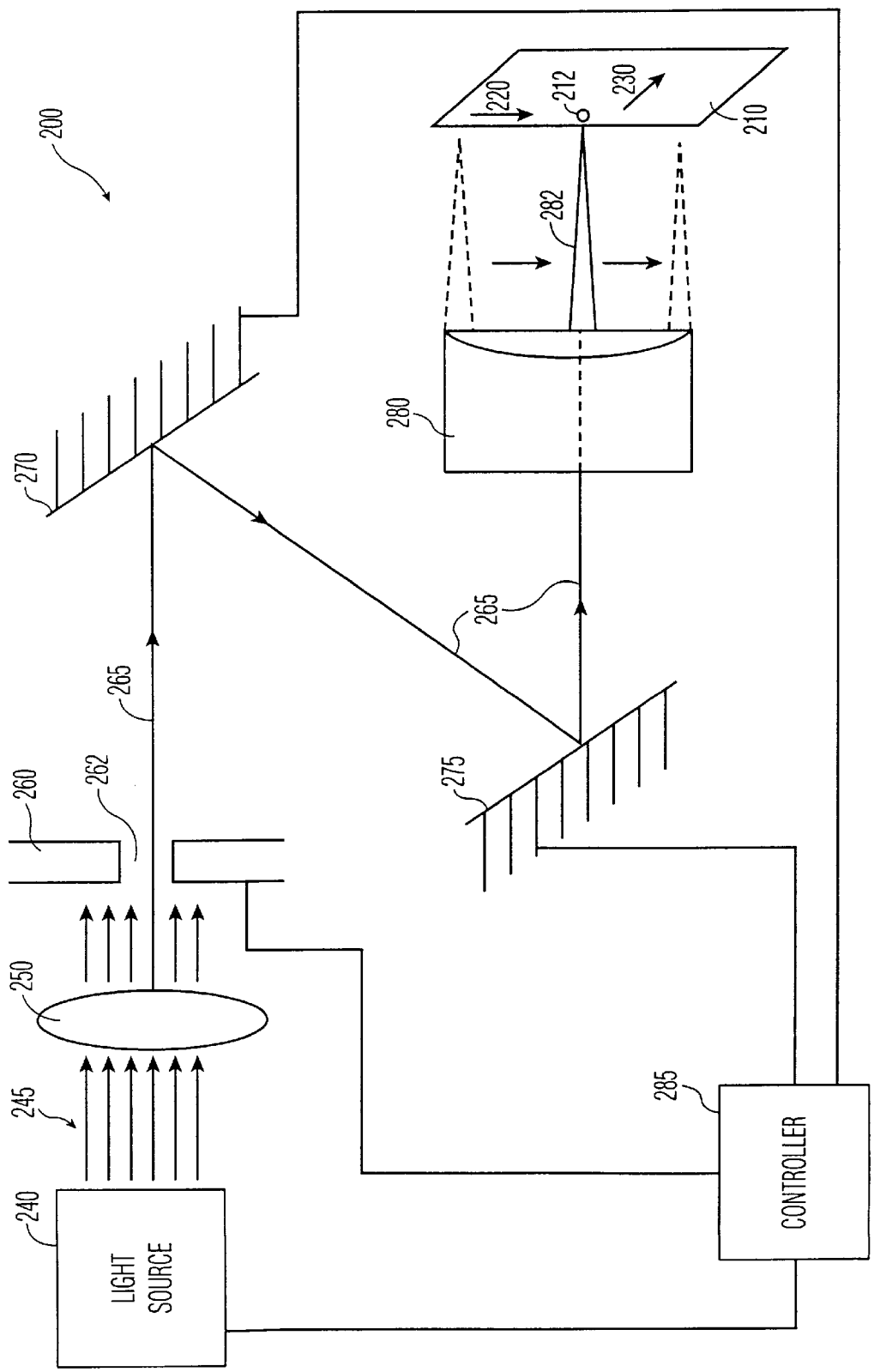
FIG. 2 is a plan view of an apparatus for scanning a light beam.

FIG. 2 shows an apparatus 200 for scanning a single beam along a first axis 220 and along a second axis 230 of a workpiece 210. A light source 240 generates a coherent light beam 245 that is directed through a reduction lens 250 and an aperture 260 to provide a conditioned beam 265 to a first galvo mirror 270. The first galvo mirror 270 reflects the conditioned beam 265 to a second galvo mirror 275. The second galvo mirror 275 directs the conditioned beam 265 through an F-θ lens 280 which focuses the conditioned beam 265 upon the workpiece 210. The first galvo mirror 270 is actuated to direct the focused conditioned beam 282 along the first axis 220 of the workpiece 210. The second galvo mirror 275 is actuated to direct the focused conditioned beam 282 along the second axis 230 of the workpiece 210. A controller 285 controls the light source 240 to control the intensity of the coherent light beam 245, controls the opening 262 of the aperture 260, and controls the actuation of the galvo mirrors 270, 275.

Figure 1:
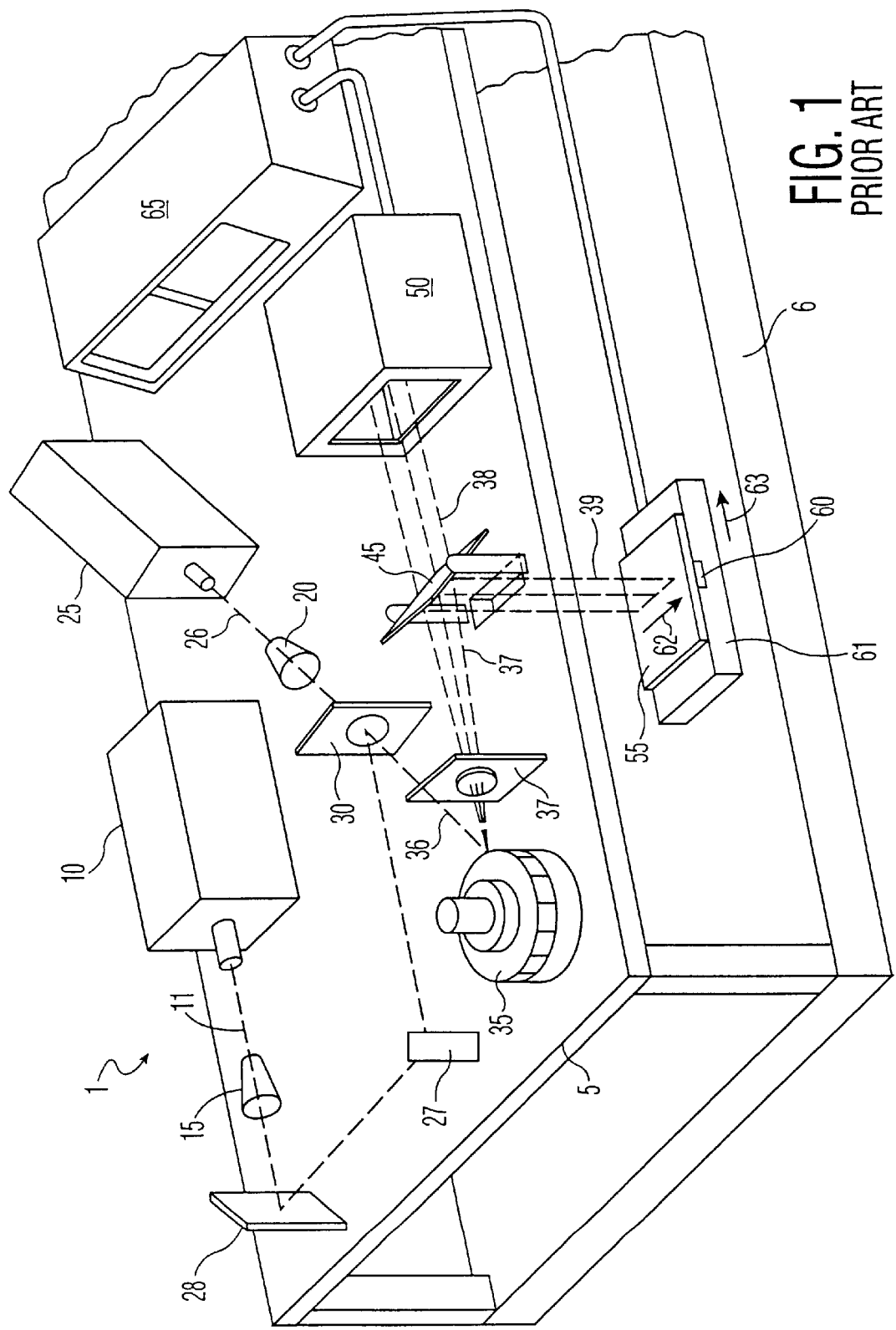
FIG. 1 is a perspective view of a conventional apparatus for scanning a beam.

The apparatus of FIGS. 1 and 2 scan a single beam across a first axis and across a second axis of their respective workpieces. If using the apparatus of FIGS. 1 or 2 to form holes in a substrate, only a single hole may be formed at one time. In addition, the beam must be actuated along two axes of a workpiece.

Figure 3:
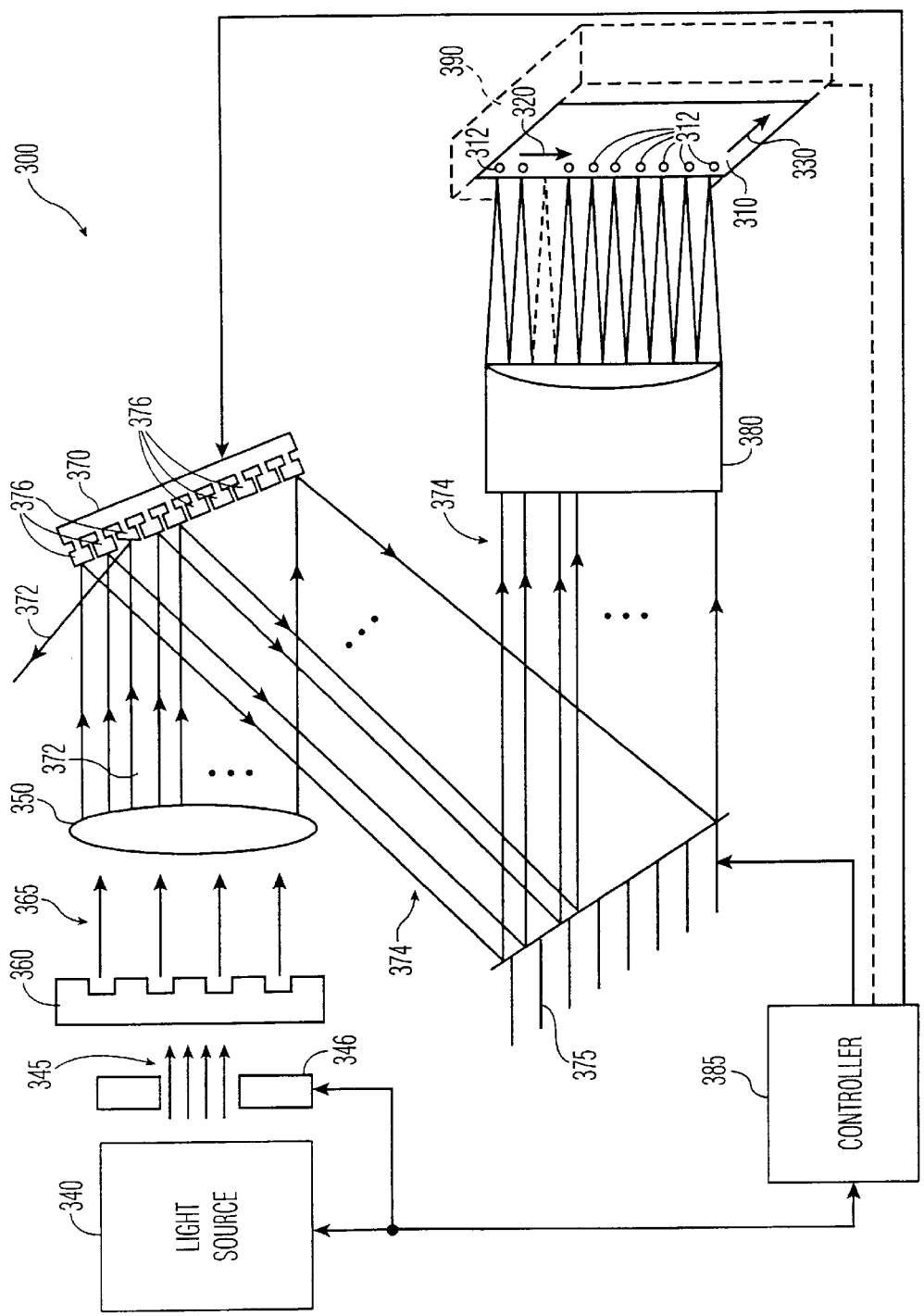
FIG. 3 is a plan view of an apparatus for scanning a plurality of light beams according to the present invention.

FIG. 3 shows an apparatus 300 for scanning a beam according to an exemplary embodiment of the present invention. A light source 340 generates a coherent light beam 345 directed through an aperture or shutter 346 to a diffraction element 360. The diffraction element 360 diffracts the coherent light beam 345 to form a plurality of parallel light beams 365, which are directed through a reduction lens 350 to a digital micromirror assembly (DMA) 370. DMA's are known to those skilled in the art and described by Jeffrey B. Sampsell in U.S. Pat. No. 5,517,347, incorporated herein by reference for its teachings on DMAs.

A DMA is a micro-mechanical device having a plurality of pixel elements. Each element includes a mirror and a memory cell. A DMA may be manufactured using standard complementary metal-oxide-semiconductor (CMOS) processing techniques. The memory of a DMA may be a static random access memory (RAM). Each memory cell of the RAM is the memory cell of a respective pixel element and may be addressed independently. A tilting mirror is fabricated over each memory cell and its address circuit. The mirror is controlled by the content of the memory cell to reflect incoming light in a desired direction or to reflect it in a direction other than the desired direction.

Responsive to a control signal from a controller 385, the DMA 370 selectively directs each of the plurality of parallel light beams 365 toward a substrate 310 via a galvo mirror 375 and a lens 380 or away from the substrate 310. As shown in FIG. 3, for example, one of the plurality of parallel light beams 372 is directed away from the substrate by the DMA 370, and the remaining ones of the plurality of parallel light beams 374 are directed toward the substrate 310.

The lens 380 focuses, onto the substrate 310, each of the plurality of parallel light beams 374 which are directed toward the substrate 310 by the DMA 370. In an exemplary embodiment, the lens 380 is an F-θ lens to provide accurate focusing along a first axis 320 of the substrate. The exemplary apparatus selectively directs each of the plurality of parallel beams 374 toward the substrate 310 before the beams are focused by the lens 380.

In an exemplary embodiment, each of the plurality of parallel light beams 374 directed toward the substrate 310 by the DMA 370, is arranged along the first axis 320 of the substrate 310. The galvo mirror 375 may be actuated to scan the plurality of beams 374 directed toward the substrate 310 along the second axis 330 of the substrate 310.

Alternatively, the galvo mirror 375 may be actuated to scan the plurality of beams 374 toward the substrate 310 along the first axis 320 and the substrate may be actuated along the second axis 330 to scan the beam across the substrate.

The controller 385 controls the light source 340 to control the intensity of the coherent light beam 345, controls the shutter 345, controls each of the micromirrors 376 of the DMA 370, and controls the actuation of the galvo mirror 375. The controller 385 may control the formation of holes in a substrate 310 as follows. The beams 374 selected from the plurality of parallel light beams 365 by the DMA 370 are focused upon the substrate 310. Each beam 374 is focused to form a corresponding hole 312 in the substrate 310. The position of the beams 374 is maintained for a predetermined time sufficient to form a plurality of holes 312 in the substrate 310 corresponding the plurality of beams 374.

While the beams 374 are being moved from one position to the next on the substrate by the DMA 370 or the galvo mirror 375, the controller may control the light source 340 to reduce its intensity or turn off the coherent light beam 345 in order to avoid damaging areas on the substrate which are not to be machined. Alternatively, the controller 385 may control the shutter 346 to block the light beam when the micromirrors 376 or galvo mirror 375 are being moved. As another alternative, the controller may maintain the coherent light beam 345 and control the DMA 370 to direct each the plurality of parallel light beams 365 away from the substrate 310 while the galvo mirror 375 is moved to shift the positions of the beams 374 in the direction of the second axis 330 of the substrate 310. This third method only works well if the strength of the coherent light beams 374 and the switching speed of the micromirror devices is sufficient to ensure that the substrate will not be damaged as the micromirrors 376 are actuated to scan the beams 374 away from, and back onto the substrate. Thus, if these conditions are met, the micromirror assembly 370 may be used to divert beams generated by a continuous laser from the substrate 310 while the substrate is translated by the translator 390 without using the shutter 345 or a pulsed laser.

Because each micromirror 376 may be controlled independently, after the galvo mirror 375 has shifted in the direction of the second axis 330 of the substrate 310, the beams 374 selected from the plurality of parallel light beams 365 by the DMA 370 may be directed by the same or different micromirrors 312. Thus, by selectively directing a plurality of parallel light beams 365 onto the substrate 310, the coherent light beam 345 may be scanned across the substrate 310 by only scanning the beam in a single direction. This provides a speed advantage over the apparatus of FIGS. 1 and 2 described above which scan a single beam across two axes of a substrate. Because each of the plurality of beams may be independently directed toward or away from the substrate, individual holes in a column or row of holes may be skipped during any hole forming operation.

In an exemplary embodiment of the present invention, the DMA 370 directs thirty-three beams toward or away from the substrate 310 and is able to achieve a throughput of greater than 1000 holes/second. The present invention is not limited to directing thirty-three beams and the power of the coherent light beam 345 may be increased or decreased as the number of directed beams increases or decreases respectively. As known to those skilled in the art, the number of parallel light beams 365 formed by the diffraction element, the power of the light source 340, and the throughput in holes/second are varied according to particular design specifications. For example, as the number of parallel beams 365 increases, the power of the light source 340 may need to be increased to maintain a desired throughput.

It is contemplated that the invention may also be duplicated using multiple light sources and multiple diffraction elements to generate a larger plurality of light beams which are applied to a single micromirror assembly 370, to multiple one-dimensional micromirror assemblies or to one or more two-dimensional micromirror assemblies.

The plurality of parallel light beams 365 do not necessarily need to be of sufficient number to form holes along the entire length of the substrate 310 along the first axis 320. For example, the selected plurality of beams 374 may be actuated along the first axis 320 of the substrate 310 by actuating the DMA 370 or the galvo mirror 375.

In an exemplary embodiment, the selected plurality of beams 374 are scanned along the second axis 330 of the substrate 310 using an optional translation table 390 (shown in phantom) rather than by actuating the galvo mirror 375. As set forth above, in this alternative embodiment, the galvo mirror may be actuated along the first axis 320 to move the multiple beams vertically on the substrate while the translation table 390 moves the substrate along the second axis.

Figure 4:
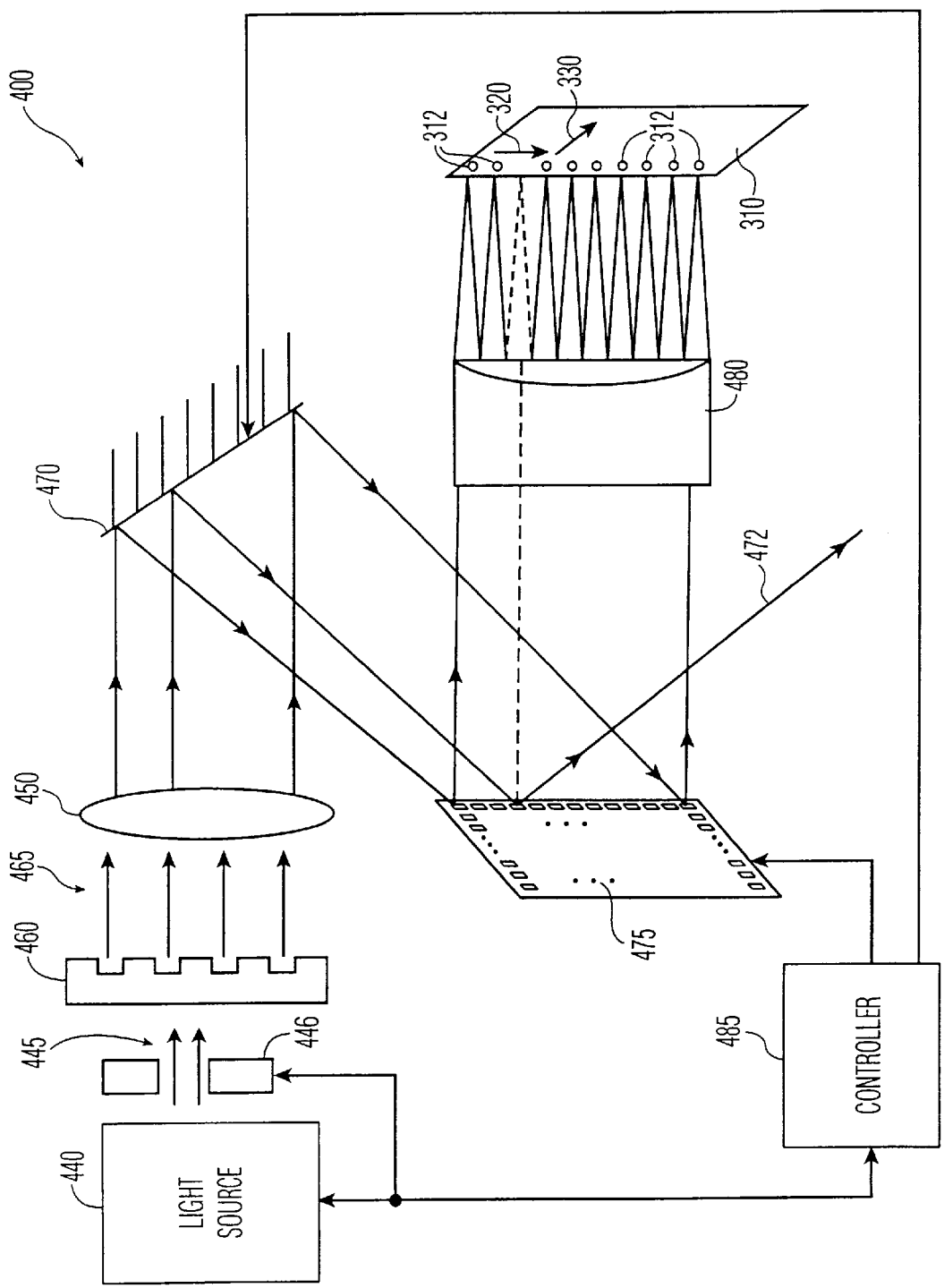
FIG. 4 is a plan view of an alternative apparatus for scanning a plurality of light beams according to the present invention.

FIG. 4 shows an alternative embodiment of the invention. In this alternative embodiment, the teachings of this invention are applied to scan a coherent light beam 445 across a substrate 310 using an array of micromirrors 475. A light source 440 generates a coherent light beam 445 directed to a diffraction element 460 through a shutter 446. The light beam 445 is directed toward a diffraction element 460 diffracts the coherent light beam 445 to form a plurality of parallel light beams 465 directed through a reduction lens 450 to a galvo mirror 470. The galvo mirror 470 reflects the plurality of parallel light beams 465 to the array of micromirrors 475. The array of micromirrors 475 selectively directs each of the plurality of parallel light beams 465 toward the substrate 310 along a first axis 320 of the substrate 310 through a lens 480 or away from the substrate 310. As shown in FIG. 4, one light beam 472 of the plurality of parallel light beams is directed away from the substrate 310. The controller 485 may control the galvo mirror 470 to scan the plurality of parallel beams 465 along the array of micromirrors 475 in order to scan the plurality of parallel beams 465 along the second axis 330 of the substrate 310. When the beam is being scanned across the substrate, it may be desirable to turn off the light source 440 or alternatively, to block the beam 445 by closing the shutter 446 to prevent damage to areas of the substrate which are not to be illuminated by the plurality of beams 465.

Although this invention has been described with reference to particular embodiments, it is not intended to be limited thereto. Rather, the scope of the invention is intended to be interpreted according to the scope of the appended claims.

What is claimed:

1. A method for directing a light beam to a workpiece comprising the steps of:
   (a) generating a single light beam
   (b) diffracting the single light beam to form a plurality of distinct parallel light beams;
   (c) directing each of the plurality of distinct parallel light beams to a digital micromirror assembly; and
   (d) selectively directing each of the plurality of distinct parallel light beams either toward the workpiece to impinge at respective separate locations on the workpiece or away from the workpiece responsive to a control signal.

2. A method according to claim 1 further comprising a step of focusing each of the selectively directed light beams onto the workpiece.

3. A method according to claim 2 wherein the plurality of parallel light beams are arranged along a first axis and the method further comprises the step of scanning the plurality of parallel light beams, which are arranged along the first axis, along a second axis.

4. A method of forming holes in a substrate comprising the steps of:

(a) generating a single light beam;

(b) diffracting the single light beam into a plurality of distinct light beams;

(c) directing each of the plurality of distinct light beams to a digital micromirror assembly;

(d) selectively directing each of the plurality of distinct light beams toward or away from the substrate;

(e) maintaining the plurality of distinct light beams in a substantially fixed position for a predetermined duration wherein each of the plurality of distinct light beams directed toward the substrate forms a respective separate hole in the substrate; and (f) actuating the plurality of distinct light beams along a first axis.

5. A method of forming holes in a substrate according to claim 4 further comprising a step after step (d) and during step (e) of directing all of the plurality of light beams away from the substrate.

6. A method of forming holes in a substrate according to claim 4 further comprising the step of closing an aperture to block the single light beam after step (d) and before step (e) and opening the aperture on the single light beam after step (e).

7. A method of forming holes in a substrate according to claim 4 wherein steps (c), (d), and (e) are repeated to form a pattern of holes in the substrate.

8. An apparatus for directing a coherent light beam to a substrate comprising:

a source of the coherent light beam;

a diffractive element for diffracting the coherent light beam to form a plurality of coherent light beams;

a controller for generating a first control signal;

a digital micromirror assembly for selectively directing each of the plurality of coherent light beams toward or away from the substrate responsive to the first control signal; and a lens for focusing each selectively directed coherent light beam onto a respective separate location on the substrate.

9. An apparatus according to claim 8 wherein the diffractive element forms a plurality of parallel light beams arranged along a first axis.

10. An apparatus according to claim 9 wherein:

the controller further generates a second control signal; and the apparatus further comprise a galvo mirror wherein the digital micromirror assembly selectively directs each of the plurality of beams onto the galvo mirror and the galvo mirror directs each of the plurality of beams to the lens and the galvo mirror is conditioned to scan the selected plurality of beams along a second axis, different from the first axis, responsive to the second control signal.

11. An apparatus according to claim 8 wherein the lens is an F-θ lens.

12. An apparatus according to claim 8 wherein the digital micromirror assembly is a two-dimensional array of micromirrors arranged along a first axis and along a second axis and the controller further generates a second control signal, the apparatus further comprising a galvo mirror which directs each of the plurality of coherent light beams to a different one of the mircomirrors along the first axis and the galvo mirror is conditioned to scan the plurality of coherent light beams along the second axis responsive to the second control signal.

* * * * *